United States Patent [19]

Ovadia et al.

[11] Patent Number: 4,903,293
[45] Date of Patent: Feb. 20, 1990

[54] PROGRAMMABLE SYSTEM CONTROLLER FOR REMOTE DEVICES

[75] Inventors: Esther F. Ovadia, Barrington; Paul G. Huber, West Warwick; Dewey L. Harris, Coventry, all of R.I.

[73] Assignee: General Electric Company, Schenectady, N.Y.

[21] Appl. No.: 378,435

[22] Filed: Jul. 10, 1989

Related U.S. Application Data

[63] Continuation of Ser. No. 132,233, Dec. 14, 1987, abandoned.

[51] Int. Cl.4 .......................................... H04M 11/00
[52] U.S. Cl. ................................... 379/102; 379/104; 379/105
[58] Field of Search .................. 379/102, 105, 104, 41

[56] References Cited

U.S. PATENT DOCUMENTS

| | | | |
|---|---|---|---|
| 4,213,182 | 7/1980 | Eichelberger | 379/102 |
| 4,562,550 | 12/1985 | Beatty . | |
| 4,580,008 | 4/1986 | Lecohier et al. | 379/104 |
| 4,598,286 | 7/1986 | Miller et al. | 379/105 |
| 4,654,881 | 3/1987 | Dolikian | 379/102 |
| 4,748,654 | 5/1988 | Gray | 379/41 |

Primary Examiner—Jin F. Ng
Assistant Examiner—Wing F. Chan
Attorney, Agent, or Firm—John P. McMahon; Stanley C. Corwin; Fred Jacob

[57] ABSTRACT

A programmable system controller is disclosed which is particularly suited for monitoring a correctly responding to user commands initiated by telephone and switch activations. The switch activations may be generated by switches of the two or three wire maintained type or momentary switches. The switch inputs are routed to a switch conditioning circuit that compensate for such problems as switch bouncing or noise levels associated with the switches. The telephone commands, in the form of an electrical signals, are routed directly to the programmable device of the system controller. The programmable system controller comprises the programmable device which responds to the switch conditioning circuit to determine the particular type of switch generating the switch command and the validity of the switch command. The programmable device in response of the valid commands and telephone commands provides a digital quantity to a sequencer, which, in turn, activates output devices such as one or more banks of relays.

6 Claims, 10 Drawing Sheets

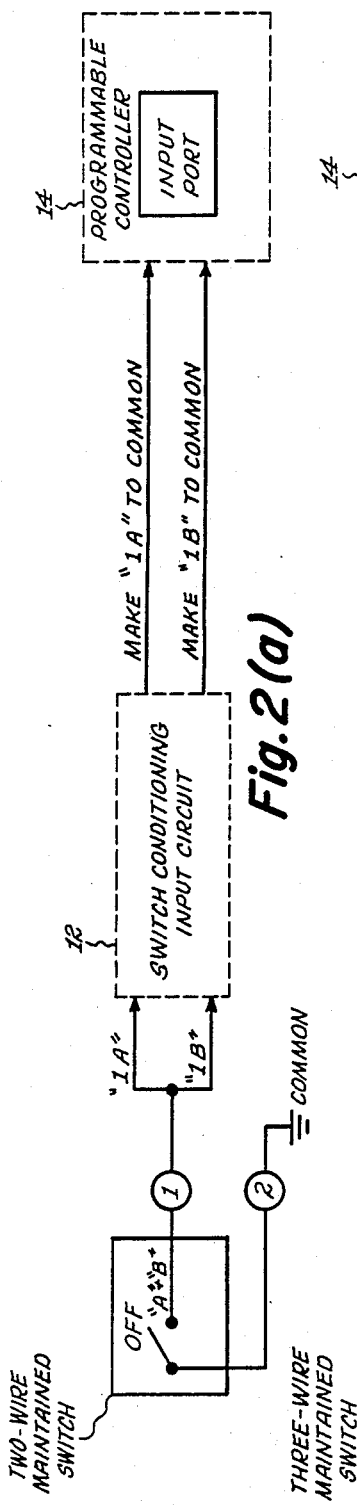
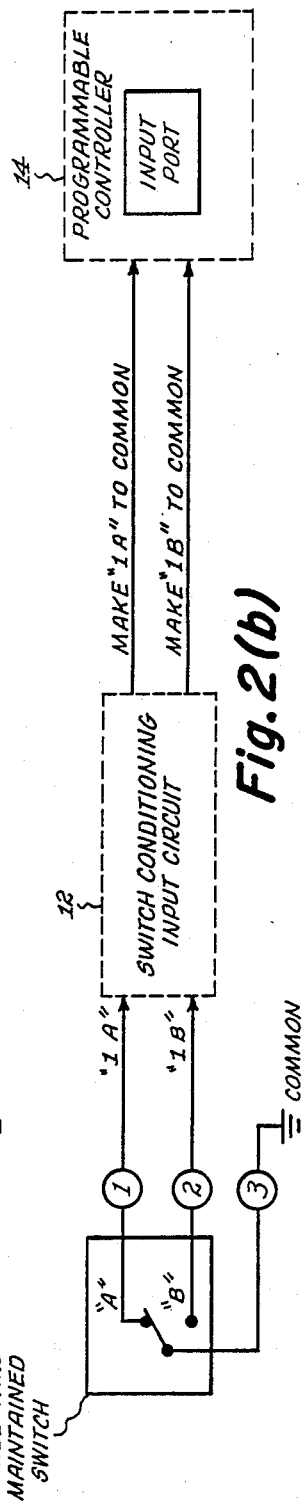
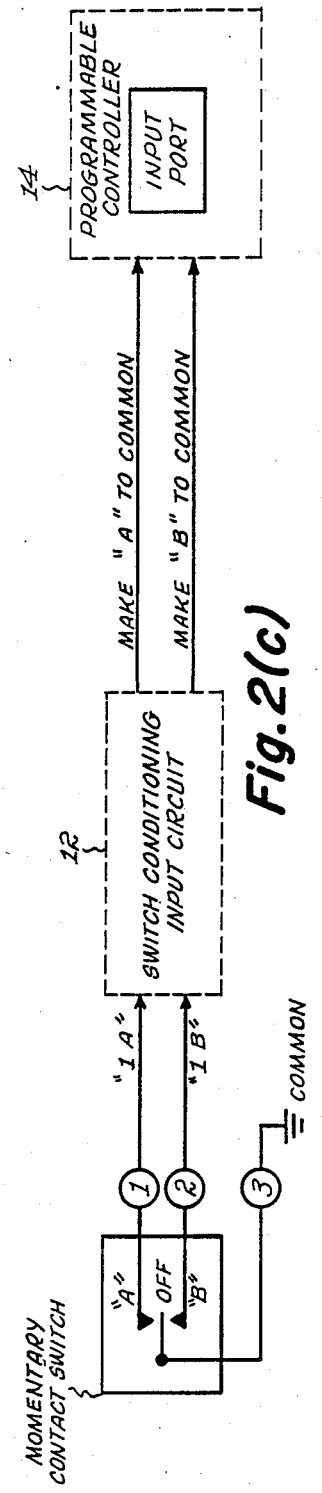

PROGRAMMABLE SYSTEM CONTROLLER FOR REMOTE DEVICES

This application is a continuation of application Ser. No. 132,233, filed 12/14/87, now abandoned.

BACKGROUND OF THE INVENTION

This invention is related to a programmable system for controlling a plurality of electrical loads, more particularly, to a programmable system controller for accepting switch and telephone commands and providing in response thereto drive signals for controlling one or more output devices such as banks of relays.

The means for selecting the required response of the programmable system controller are typically in the form of switches that may be manually or automatically operated. For certain applications it is advantageous that the programmable system controller have the capability to respond to commands initiated by a telephone. The telephone commands are in the form of electrical quantities having a value determined by the selection of the push buttons of the telephone. The switches along with the telephone commands provide the stimuli for the dynamic operation of the programmable system controller.

The switches may be of a two-wire maintained switch, commonly known as a single pole, single throw (SPST) switch, a three-wire maintained switch, commonly known as a single pole, double throw (SPDT) switch, or a momentary switch comprised of two push buttons and commonly in the form of two single pole, single throw, momentary action switches. The programmable system controller must be able to correctly respond to these various types of switches. For those applications related to interfacing with a telephone, the programmable system controller must be able to respond to the electrical signals generated the manual operation of the telephone and notify or direct the correct sequential operation of the telephone.

The selectable switches sometimes in cooperation with the telephone commands commonly determine the mode of operation of the programmable controller so as to sequentially operate one or more banks of relays, which, in turn, determine the operation or state of remote devices. The switches along with the telephone commands may select the operation of Bank A and Bank B relays, Bank A relays or Bank B relays.

The automatic or manual operation of the switches may allow or cause multiple switch input commands to be sent and received by the programmable controller without allowing for ample time for the programmable controller's response. The programmable controller must be able to decide which of the multiple switch inputs received should be ignored and which ones should be responded to in order to assure the correct operation within the limitation of the programmable controller's response time. Further, it is desired that the programmable controller be able to make this determination even though it is unaware of what type of various switches is generating the switch command so as to properly activate the desired, commanded, Bank(s) of relays.

The telephone commands initiated by the manual operation of the telephone having a variable duration must be responded to or ignored by the programmable controller within a predetermined duration so the programmable controller may also be able to perform other tasks. Further, the programmable controller must be able to lead or direct the manual operation of telephone to allow the operator to perform the desired operation within the predetermined duration established by the controller.

Prior art programmable controller typically set a fixed method or process to respond to the switch input commands. For example, some prior art programmable controller respond to the first switch input command which is received and ignores any other switch commands during its processing of the first input command. Still further, other programmable controllers set a fixed duration for detecting the occurrence of switch input command so as to only respond to the first and last input switch commands received during the fixed input duration. In addition, with regard to responding to various type of switches generating the input switch commands, the types of switches used to generate the switch input command are hard wired and have a fixed location, time wise, in any transmission of the input switch commands so that the programmable controller has prior knowledge of each type of switch as to it being a two-wire maintained, a three-wire maintained or a momentary switch.

It is an object of the present invention to allow the user or the person selecting the type of switch, which generates the related switch commands, to be given the flexibility to establish the functionality of each switch as being a two-wire maintained, a three-wire maintained or a momentary switch and thereby place the burden to determine the type of switch being used on the programmable controller that is responding to the selected switch command. If such is accomplished, it permits the user of the programmable controller to remotely control electrical loads by means of various types of select switches that may be all placed on a single device such as a control panel and significantly ease the limitations put on the product by eliminating switch-type constraints.

Further, it is an object of the present invention to allow for an increased variation of component tolerances of the switches together with the associated circuit components that interface with these switches. Specifically, it is desired to increase the variation of component tolerances related to the switches themselves and also to allow for increased variations of the resistors and capacitors typically used to interface with the switches that provide a filtering function of the related switch commands which are transmitted to and received by the programmable controller. It is desired that the programmable controller provide means to compensate for the increased tolerances of all these devices while at the same time provide the desired response time to the received switch input commands.

Further still, it is an object of the present invention to provide a programmable controller that assures that when an input switch command is received without sufficient time to respond to successive received switch inputs, that the individual input actuations that do not effect the final output state be rejected and not acted upon by the programmable controller. In such an operation the programmable controller must selectively ignore the unnecessary received switch commands.

It is an object of the present invention to provide a programmable controller that responds to and directs the sequential manual operation of the telephone, in the form of electrical signals within a predetermined duration.

Still further it is an object of the present invention to provide a programmable controller having a sequential and predetermined operation that allows for a minimum output signal which is transmitted to relays controlling remote devices so that the maximum duty cycle of the relay is not exceeded, thereby, allowing for an increased reliability of the related drivers activating the relays.

SUMMARY OF THE INVENTION

This invention is directed to a programmable system controller and a method of operating such which are particularly suited for responding to one or more input select switches along with telephone commands and determining the various types of the select switches so as to provide the correct response to control output devices such as one or more Banks of relays.

The programmable controller system controller controls a plurality of distributed electrical loads including a plurality of control circuits. The programmable system controller comprises one or more input selectable means of various types that are appropriately connected to an excitation source for respectively generating one or more switch command signals. The programmable controller system further comprises conditioning means for receiving the one or more switch command signals and respectively generating one or more representative digital signals. Programmable means receives the one more representative digital signals and has means for determining the various types of the input selectable means and if the generated switch command signals are present and constant for predetermined durations. The programmable means responds to the present and constant switch commands and generates output digital quantities in response thereto. Sequencer means receives the output digital quantities and generates in response thereto one or more sequence control signals. The control circuits receive the sequence control signals and generate in response thereto drive signals so as to control the on-off state of remote devices.

The programmable means may also receive electrical signals generated by a telephone device and respond thereto by generating the output digital quantities to the sequencer means. The programmable means may further generate digital signals to the telephone device to provide for the sequential operation of the telephone device.

BRIEF DESCRIPTION OF THE DRAWINGS

FIGS. 2(a), 2(b) and 2(c) respectively illustrate a two-wire maintained switch, a three-wire maintained switch, and a momentary contact switch.

FIGS. 5 (a)–5(b) are interrelated to FIG. 5 and illustrate the classifications related to the input switch commands to the programmable controller.

DETAILED DESCRIPTION OF THE PREFERRED EMBODIMENT

Figure 1:
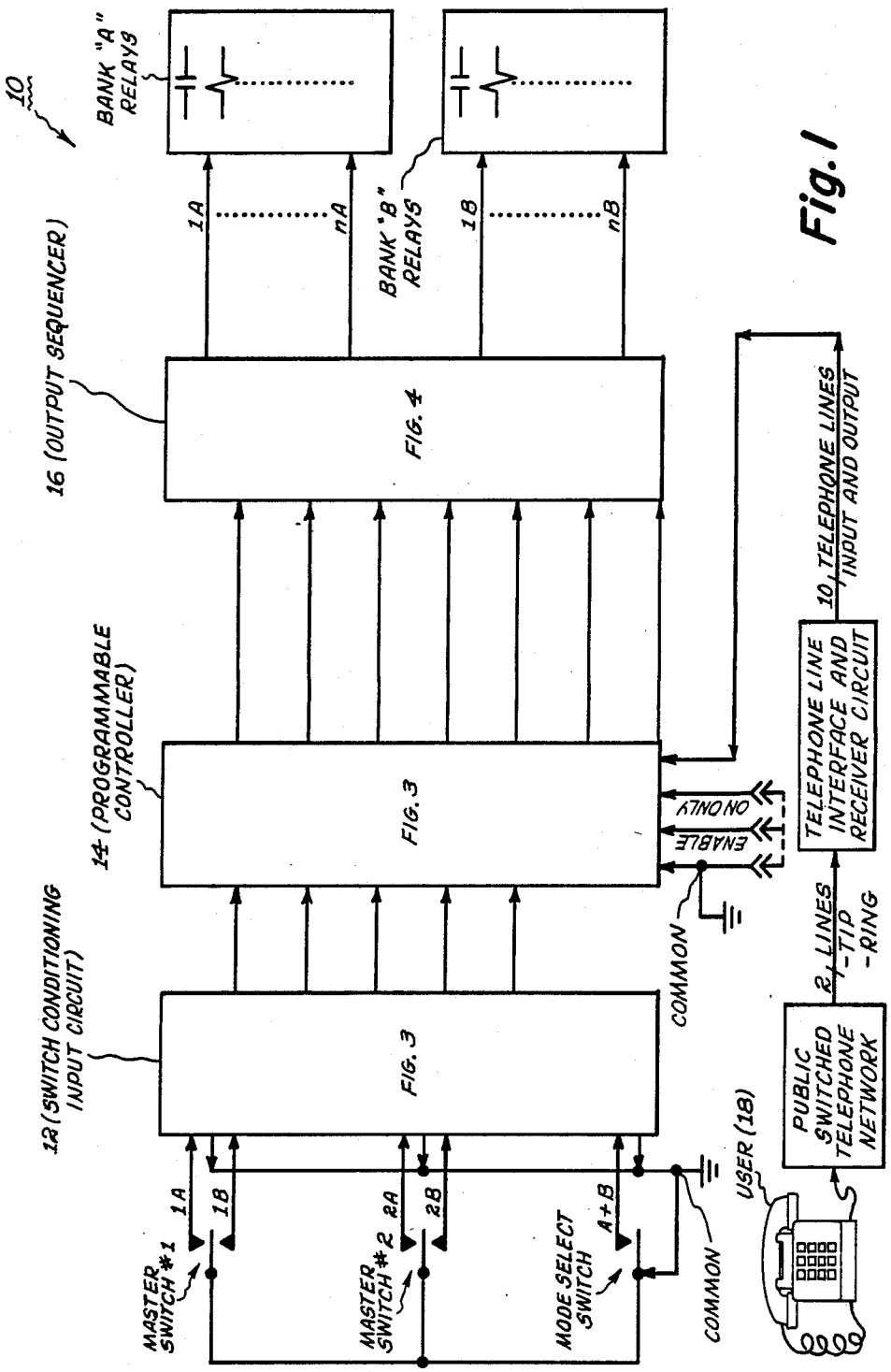
FIG. 1 is a block diagram of a programmable system controller in accordance with the present invention.

FIG. 1 is a block diagram of a programmable system controller 10 of the present invention. The programmable system controller 10 responds to one or more input selectable means of various types that are appropriately connected to an excitation source for respectively generating one or more switch control signals. The input selectable means are shown in FIG. 1 as Master Switch No. 1, Master Switch No. 2, and Mode Select switch. The generated switch command related to the switches shown in FIG. 1 are routed to switch conditioning input circuit 12.

The switch conditioning input circuit 12 preferably performs a high frequency filtering function so as to reduce and avoid false reactions typically caused by switch conditions such as contact bouncing, and also reduces noise levels that may be present on the switch lines. The output stages containing digital signals representative of the received switch commands of the switch conditioning means are routed to a controller 14 having programmable means, to be discussed hereinafter as programmable controller, which responds to the received inputs and generate in response thereto digital output quantities which are routed to an output sequence 16.

The output sequencer 16 decodes the output digital quantities of the programmable controller and generates in response thereto sequence control signals to control circuits of the programmable system controller. These control circuits in one embodiment of the present invention are in the form of two banks of relays, Bank A and Bank B relays with Bank A having control lines 1A . . . nA for accepting the sequencer control signals of sequencer 16 and Bank B having control lines 1B . . . nB for accepting the sequencer control signals of sequencer 16.

The programmable controller also has the capability to respond and interact with commands initiated by a USER 18, such as an individual, by means of a telephone. The commands initiated from the telephone are supplied to related equipment such as a public switched telephone network that generates two functions commonly known as "tip" and "ring" that are routed on two respective lines to a telephone line interface and receiver circuit which, in turn, generates and responds to ten (10) input and output functions that are routed to the programmable controller 14. The operation of the telephone with the programmable means 14 is determined by the electrical information present on the ten (10) telephone lines illustrated in FIG. 1. These 10 telephone lines provide the input and output information between the telephone and the programmable controller. The programmable controller 14 receives digital information generated by the telephone device and its related equipment and responds thereto, to be described, by generating the output digital quantities to the output sequencer 16. The programmable controller 14 also generates digital signals to the telephone device and its related equipment to interact with the operator of the telephone and provide a predetermined sequential operation of the telephone The interface functions between the switches of FIG. 1 and the switch conditioning input circuit 12 are given in Table 1.

Table 1

INPUT FUNCTIONS TO SWITCH CONDITIONING INPUT CIRCUIT

MASTER SWITCH #1
  Switch Input 1A
  Switch Input 1B
MASTER SWITCH #2
  Switch Input 2A
  Switch Input 2B
MODE SELECT SWITCH
  Select Mode A+B The interface functions between the switch conditioning input circuit 12 and the programmable controller 14 are given in Table 2.

Table 2

INPUT FUNCTIONS TO CONTROLLER FROM SWITCH CONDITIONING INPUT CIRCUIT

Make 1A
Make 1B
Break 2A
Break 2B
Make "A+B"

The programmable controller in addition to the previously discussed ten (10) telephone lines also has three input functions: (1) Common, (2) Enable and (3) On Only which determine the communication link between the programmable controller and the telephone device. Conversely, the Mode Select Switch of FIG. 1 is not utilized for the operation of the programmable controller with the telephone interface.

The interface functions between the output sequencer 16 and the Bank "A" relays and Bank "B" relays are given in Table 3

TABLE 3

| OUTPUT FUNCTIONS FROM CONTROLLER |
| --- |
| Relay 1A |
| . |
| . |
| . |
| Relay nA |
| . |
| . |
| . |
| Relay 1B |
| . |
| . |
| . |
| Relay nB |

The interface between the output sequencer 16 and the Bank A relays and Bank B relays are shown as comprising a plurality of lines 1A . . . nA and 1B . . . nB respectively. The number of lines 1A . . . nB are determined by the number of relays desired for the system interaction so as to control the number of distributed electrical loads determined by the system application envisioned by the usage of the programmable system controller of the present invention. For the embodiment to be described the programmable system controller 10 of FIG. 1 implements sixteen (16) relays.

The various types of switches related to the input selectable means shown in FIG. 1 may be of the type illustrated in FIGS. 2(a), 2(b) and 2(c). FIG. 2(a) illustrates a two-wire maintained switch commonly known as an on-off switch. For such switches an excitation source, such as the shown common of FIG. 2, is supplied by the receiving device, such as switch conditioning input circuit 12 so as to be responded to by the switch conditioning input circuit and is wired to the common or arm of the two-wire switch which is activated either manually or by an external source so that the ON position is provided with the excitation and routed as a electrical signal to the conditioning input circuit 12. For a two-wire operation of a master switch having A and B positions, the user must tie together the A and B legs of the corresponding master switch. Thus the A and B positions change simultaneously.

As previously mentioned, the conditioning input circuit 12 commonly provide a high frequency input filtering function so as to compensate for some switch bouncing or noise that may be present on the received input signals. The switch conditioning circuit provides two digital signals in response to its received command and such signals are herein termed functions "Make '1A' To Common" and "Make '1B' To Common" which are routed to an input port of the programmable controller 14.

A three-wire maintained switch or commonly known two-position switch is illustrated in FIG. 2(b) and interfaces with the switch conditioning circuit 12 in a manner similar to the previously described two-wire maintained switch, except that two separate command signals respectively representative of the A and B positions of the three-wire device are routed to the switch conditioning circuit 12. The switch conditioning circuit 12 in response to the A and B commands, respectively, generates the herein termed functions "Make '1A' To Common" and "Make '1B' To Common", which, in turn, are routed to the input port of the programmable controller 14.

A momentary contact switch is illustrated in FIG. 2(c) and is accepted and responded to by the switch conditioning circuit 12 in a similar manner as previously described with regard three-wire maintained switch so as to generate herein termed functions "Make 'A' to Common" and "Make 'B' to Common" signals, which, in turn are routed to the input port of the programmable controller 14.

Figure 3:
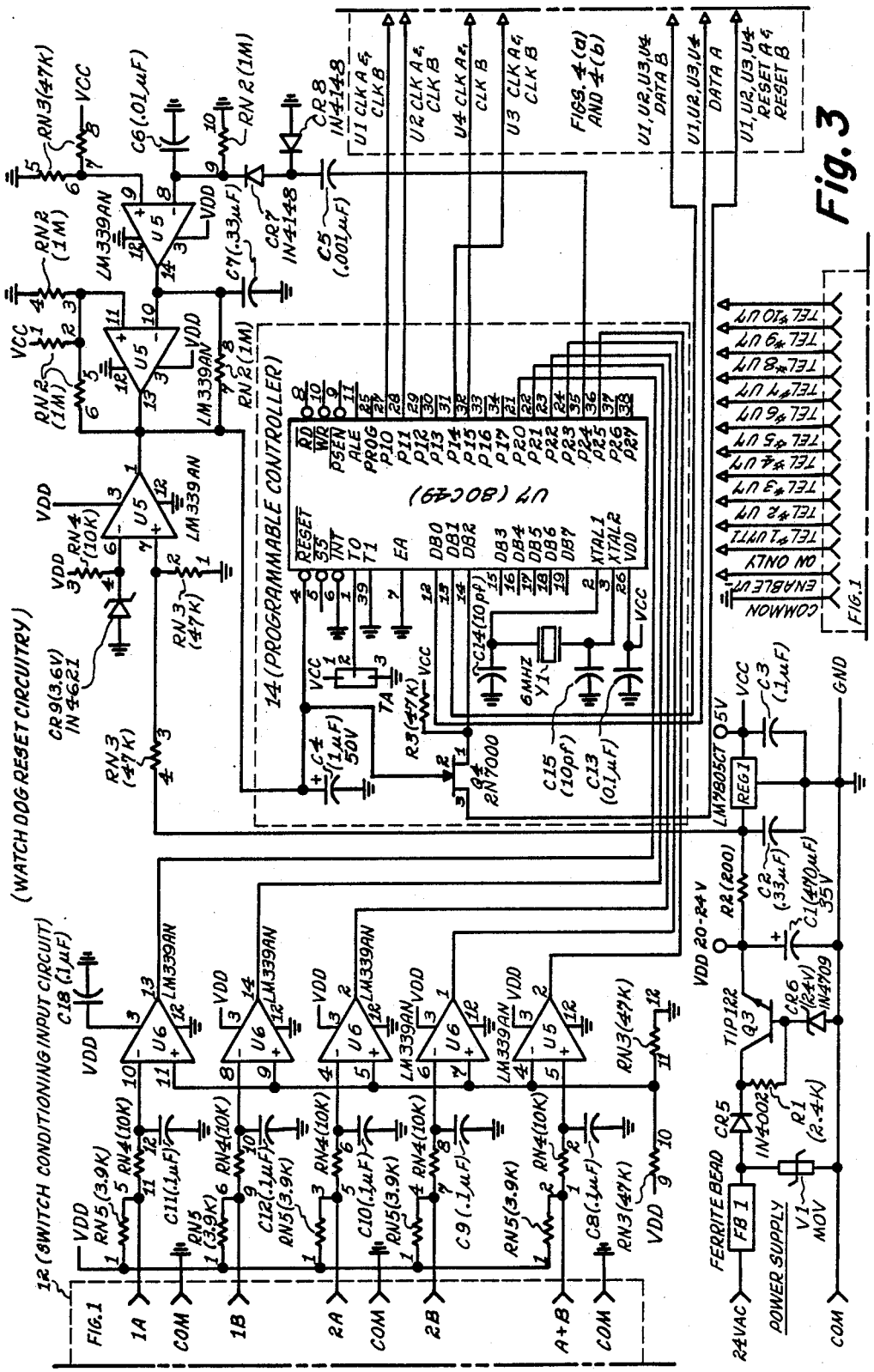
FIG. 3 is a circuit diagram of a switch conditioning input circuit and the programmable system controller related to the present invention.

A circuit diagram of the switch conditioning input circuit 12, as related to the switches illustrated in FIG. 1, is shown in FIG. 3. The switch conditioning input circuit is comprised of a plurality of read circuits for each switch input and include a comparator such as U6 of FIG. 3, a pull-up resistor; RN5 having a typical value of 39K, and a filter arrangement connected at the input to the comparator and consisting of a resistor RN4, having a typical value of 10K, and a capacitor such as C11 of FIG. 3 having a typical value of 0.1 microfarads. A switch input such as 1A of FIG. 1, is read using the comparator which compares the switch input voltage to VDD/2 which is a 12 volt reference voltage formed by a voltage divider consisting of two resistors RN3 connected to VDD. If the switch input voltage is greater than 12 volts, the switch is considered to be an open connection. If the switch voltage is less than 12 volts, the switch is considered to be in a closed position. The output of the comparator related to input 1A is fed directly to the microprocessor port shown in FIG. 3 as P20 of the programmable controller. The dormant or non-activate state of the switch input, such as 1A, is associated with having the RN5 3.9K pull-up resistor which is connected to VDD being a reference voltage such as 24 volts. The activate occurrence or switch closure causes the contact of the closed switch to be connected to one side of the filter resistor RN4. The RN4 resistor and the 0.1 microfarad capacitor form a RC noise filter having a 1 millisecond time constant so as to filter the switch 1A signal. Further filtering of the 1A signal is accomplished in software routines of the microprocessor 14. This signal 1A is compared to the positive input terminal, Pin 11, which has 12 volts present on it. When switch 1A is activated, the output of the corresponding comparator, pin 13 of U6 is placed into a high voltage level which is greater than 3.5 volts. When switch 1A is activated or floating, the comparator output, pin 13 of U6, is placed in a low condition which is less than 0.7 volts. The remaining switch inputs 1B, 2A, 2B, and A+B operate in a similar manner as described for switch input 1A.

The VDD reference voltage related to the pull-up resistors of the switch inputs is developed a power supply having the circuit components with their values given in FIG. 3 and arranged as shown in FIG. 3. The power supply of FIG. 3 accepts an A.C. voltage having a typical value of 24 V.A.C. and develops therefrom the D.C. reference voltage VDD having a value of about 20 to 24 V.D.C. The power supply further develops a D.C. reference voltage VCC having a value of about 5.0 V.D.C. The VCC and VDD are routed to the various electrical elements of FIG. 3 and also FIG. 4 as shown therein. If desired the VDD and VCC may be developed by means external to the programmable controller system of the present invention.

FIG. 3 further shows a Watchdog Reset Circuit which is preferably provided to reset the Programmable Controller to a known or predetermined state in the unlikely event that electrical noise causes the Programmable Controller to adversely execute erroneous instruction in a closed loop manner. A typical duration for this closed loop condition is about 40 milliseconds. For such a closed loop condition, the Watchdog Reset Circuit reset the Programmable Controller to a location in its stored memory which causes it to execute its power-up sequence routine. The Watchdog Reset circuit has as one of its input the VDD reference voltage and is connected to pin 24 of the Programmable Controller 14. The Watchdog Reset Circuit is comprised of circuit components of a type or of a value given in FIG. 3 and arranged as shown in FIG. 3.

Figure 4A:
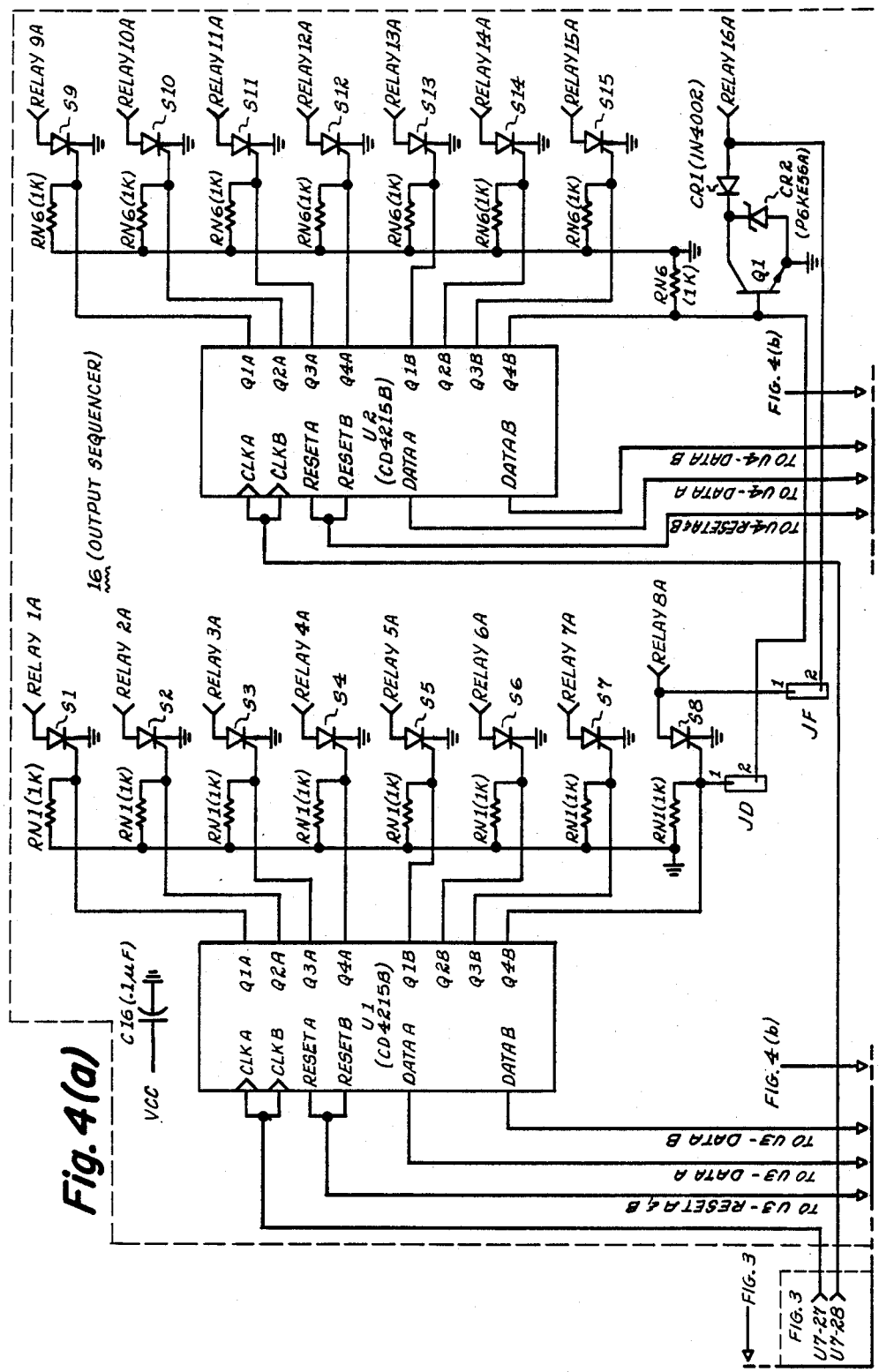
FIGS. 4(a) and 4(b) are circuit diagrams of an output sequencer which interfaces with a portion of the output stage of the programmable controller related to the present invention.
Figure 4B:
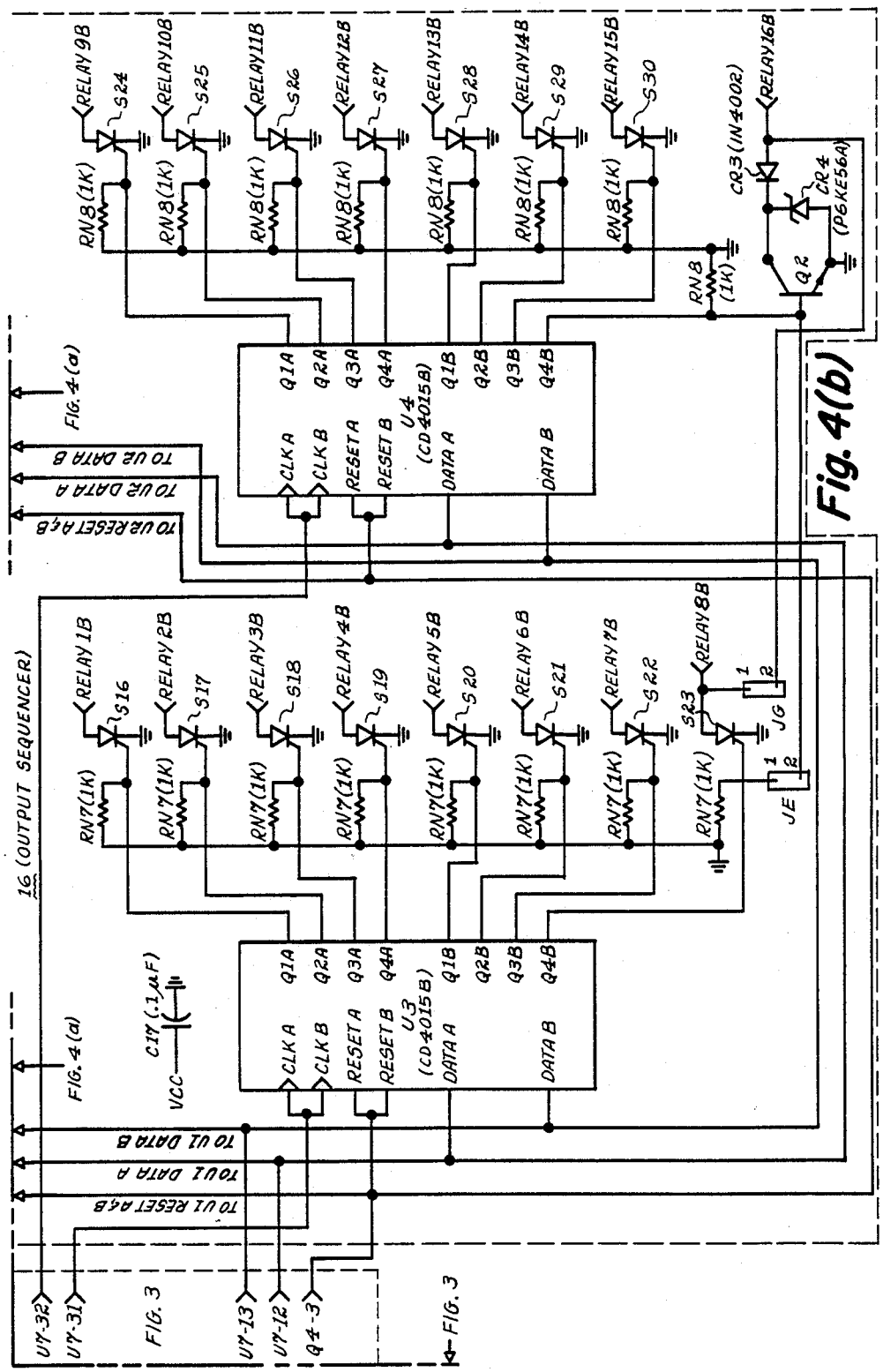
Figure 4C:
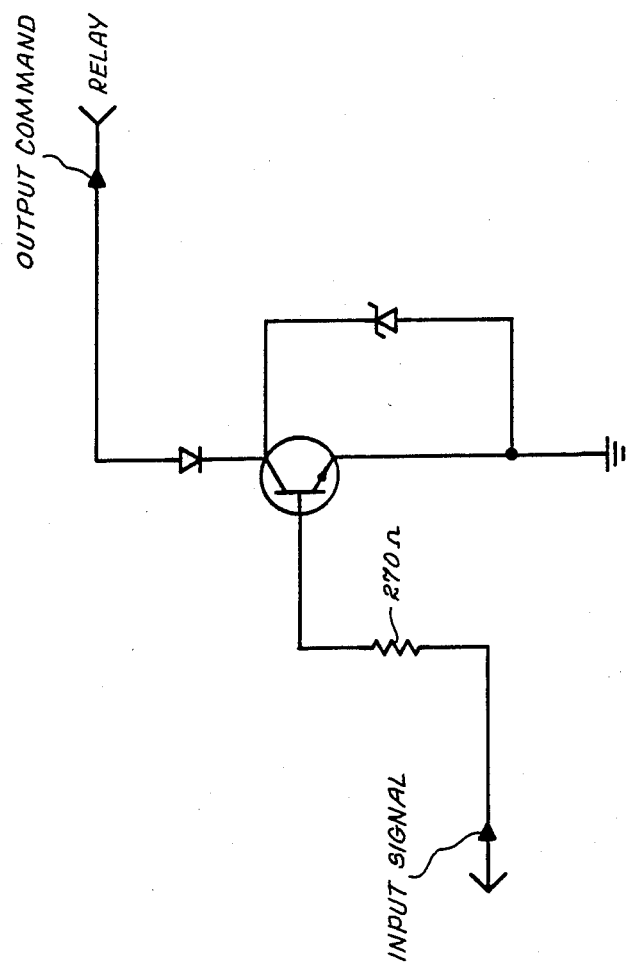
FIG. 4(c) illustrates a transistor network preferably employed in the output stages of the output sequencer for the operation of the programmable system controller in response to telephone activated commands.

FIGS. 4(a) and (b) are circuit diagrams of the output sequencer 16 which is controlled by the programmable controller 14, to be discussed hereinafter, under command from the input switch devices. FIG. 4(c) generally shows a transistor arrangement at the output stage of the output sequence that is preferably implemented for the programmable controller response to input conditions related to the telephone interface. The output sequencer of FIGS. 4(a) and 4(b) is comprised of four decoders U1, U2, U3 and U4 which generate the electrical drive signals to respectively control the activation of relays 1A-8A; 9A-16A; 1B-8B and 9B-16B. The control signals of relays 1A-16A and 1B-16B are respectively related to lines 1A-nA and 1B-nB of FIG. 1.

Decoder U1 of FIG. 4(a) is provided with outputs Q1A, Q2A, Q3A, Q4A, Q1B, Q2B, Q3B, and Q4B which respectively control the active or non-activate states of relays 1A, 2A, 3A, 4A, 5A, 6A, 7A and 8A. The outputs of Decoder U1 are interconnected to their respective relay by a transistor device each arranged with a 1K resistor (RN1) as shown in FIG. 4(a). Decoder U1 has its clock A and B inputs (CLK A and CLK B) connected to pin 27 of the programmable controller 14 and its reset A and B inputs (RESET A and RESET B) connected to pin 3 of the Q4 transistor of the programmable controller 14. Further, Decoder U1 has its DATA A input connected to pin 12 of the programmable controller 14 and its DATA B input connected to pin 13 of the programmable controller 14. The Decoder U2 of FIG. 4(a) and Decoders U3 and U4 of FIG. 4(b) are arranged in a manner as described for Decoder U1. The Decoders operated by the programmable controller in response to the telephone interface are not shown in FIGS. 4(a) and 4(b) but are of the same type as U1, U2, U3 and U4 of FIGS. (4(a) and 4(b) and have an interface to be described with regard to U8 and U19 of Table 4 that cooperates to provide an output signal to control the transistor network generally illustrated in FIG. 4(c). FIG. 4(c) shows an input signal generated by a Decoder, such as U8 or U19 indicated in Table 4, in response to the programmable controller responding to the commands initiated by the telephone interface. The network of FIG. 4(c) in response to the applied input signal generates an output command to a relay related to the telephone interface.

The programmable controller 14 acts as the control means for the four Decoders U1, U2, U3, and U4 each being a CMOS shift register 4015B. Each 4015B chip consists of two identical, independent 4-state serial input/parallel output shift registers. Each register has independent clock and reset inputs with a single serial data input. Data is shifted from one stage to the next during the positive-going clock transition. When a high level is applied to the reset line, each shift register is asynchronously cleared. A '0' logic level appears at each of the outputs of the shift register, thus, disabling the activation of the corresponding relay outputs. A relay is activated by applying a logic level of '1' at the corresponding shift register output. A '1' level at the reset inputs of the Decoders asynchronously resets to '0' the outputs of each of the corresponding shift register. A '0' level is required when synchronous operation is desired.

The programmable controller 14, shown in FIG. 3, primarily comprises a microprocessor of a type such as 80C49 manufactured by Intel Corporation of Santa Clara, Calif. The microprocessor 80C49 has 27 lines which can be used for input or output functions. These lines are grouped as 3 ports of 8 lines (24) each which serve as either inputs, output or directional ports. The remaining three lines can serve as test inputs. The data rates of the input parts for the configuration used in the present invention is about 2.5 K.C.

The programmable controller 14 of the present invention, in particular the Microprocessor U7 of FIG. 3, is adapted to respond to the switch inputs from a Remote Control Activator herein termed RMS or alternatively to the telephone interface from a Telephone Control Activator, herein termed RTEL along with a portion of the switch inputs. The interfaces of Microprocessor U7 to (1) the Switch Conditioning Input Circuit related to the RMS and RTEL; (2) User 18 related to the RTEL; (3) Watchdog Reset Circuitry related to both RMS and RTEL; and (4) the Output Sequencer related to both RMS (U1, U2, U3 and U4) and RTEL (U8 and U19) are given in Table 4 for both the RMS and RTEL applications as indicated.

TABLE 4

| | Microprocessor U7 | |
|---|---|---|
| | RMS | RTEL |
| Switch Conditioning Input Circuit (12) | | |
| U6 pin 13 (Input 1A) | P20 | P20 |
| U6 Pin 14 (Input 1B) | P21 | P21 |
| U6 Pin 2 (input 2A) | P22 | P22 |
| U6 Pin 1 (Input 2B) | P23 | P23 |
| U5 Pin 2 (Input A + B) | P25 | |
| User (18) | | |
| Common | | |
| Enable | | P17 |
| On Only | | T1 |
| Tel #1 (Ring) | | P16 |
| Tel #2 (Loop) | | P15 |
| Tel #3 (Hook) | | DB6 |
| Tel #4 (D1) | | P10 |
| Tel #5 (D2) | | P11 |
| Tel #6 (D3) | | P12 |
| Tel #7 (D4) | | P13 |
| Tel #8 (Data Valid) | | P14 |
| Tel #9 (DTMF Enable) | | DB7 |
| Tel #10 (Tone) | | P25 |
| WatchDog Reset Circuitry | | |
| C5 | P24 | P24 |
| Output Sequencer (16) | | |
| U1 | | |
| CLKA and CLK B | P10 | |
| U2 | | |
| CLKA and CLKB | P11 | |
| U3 | | |
| CLKA and CLKB | P14 | |
| U4 | | |
| CLKA and CLKB | P15 | |
| U1, U2, U3, U4 | | |
| Data A | DB0 | |
| U1, U2, U3, U4 | | |
| Data B | DB1 | |
| U1, U2, U3, U4 | | |
| Reset A | Q4 pin 3 | |
| U1, U2, U3, U4 | | |
| Reset B | Q4 pin 3 | |
| U8, U19 | | |
| A In | | DB0 |
| U8, U19 | | |
| B In | | DB1 |
| U8, U19 | | |
| C In | | DB2 |
| U8, U19 | | |
| D In | | DB3 |
| U8 | | |
| Strobe | | DB5 |
| U19 | | |
| Strobe | | DB4 |
| U8, U19 | | |
| Reset A | | Q4 pin 3 |

The Common input of the telephone interface is interconnected to the Enable or ON-ONLY inputs or both so as to notify the microprocessor U7 which of the various selectable routines (to be described) related to communicating with the RTEL is to be accomplished by the microprocessor U7.

OPERATION OF THE PROGRAMMABLE SYSTEM CONTROLLER OF THE PRESENT INVENTION

The programmable controller 14 of the present invention operates in initial response and control by the various selectable switches such as the two-wire maintained switch, a three-wire maintained switch or a momentary contact switch and combinations thereof. The programmable system controller also has the capability to respond and control the operation of the USER 18 (Telephone) or RTEL which is meant to include both the interface and microprocessor U7 routines to be described.

The RTEL decodes TouchTone signals received from the telephone lines and activates corresponding interfaces shown in FIG. 1. The RTEL internally controls the state of the interface (On or Off Hook conditions of the telephone) and provides several other signals required for telephone usage in a prescribed control sequence. The control sequence is initiated when a USER calls the extension number related to the RTEL. If the ENABLE input is shorted, that is if the Common input is connected or jumpered to the ENABLE input, the RTEL recognizes the ring signal, lights the "Ring" light emitting diode (LED) (located on an input panel of the RTEL) (not shown), and answers the phone during the dead time between rings. The RTEL extinguishes the "Ring" LED after it answers the line, and lights the "On Line" LED (not shown). If the ENABLE input is open, the RTEL does not answer the Telephone line. The RTEL issues a two second long, 1000 Hz tone to the user. The user must wait until the tone ends before proceeding.

The user presses the relay output number desired to be activated by the selection on the telephone keypad. The user then presses "1" on the keypad to turn the relay output ON. If the ON ONLY input is shorted, that is if the Common input is connected or jumpered to the ON ONLY input, the user cannot turn OFF relays using the telephone. If the ON ONLY input is open circuited, then the user presses "0" to turn OFF the relay output. The user then presses either "*" or "#" on the telephone keypad. If "*" is pressed, then operation of the RTEL continues and awaits for the relay output number to be selected, assuming less than 15 seconds has elapsed. If more than 15 seconds have elapsed since answering the phone, the RTEL always hangs up the line. The user presses "#" to indicate End of Message (EOM) to the RTEL. The RTEL recognizes the "#" symbol as End Of Message (EOM), and hangs up the telephone lines. If more than 15 seconds passes from first answering the line, the RTEL hangs up. In either case, the RTEL extinguishes the "On Line" LED upon hanging up the line. The RTEL decodes the telephone data, and activates the appropriate output for 120 milliseconds.

The operating mode of the programmable controller related to the switches of FIG. 1 which are also partially utilized in the described telephone interaction is determined by the selection of the position of the Mode Select switch. The selection of the Mode Select switch is not applicable to the telephone interaction of the programmable system controller. When it is desired to operate in one bank mode applicable to the switch interface, the Mode Select switch is selected to the A+B position or a jumper must connect the A+B input to Common. The programmable controller in response to the Mode Select Switch provides the proper drive signals to the output relays so as to configure these relays as either of two separate banks, Bank A or Bank B or as a single bank composed of Bank A and bank B. If the Mode Select switch is selected to A+B position, the output relays are configured to the composite Bank A and B, whereas, if the Mode Select switch is not selected to the A+B position, the output relays are separately controlled as Bank A or Bank B. The programmable controller 14 provides the digital output quantities so as to selectively drive the Banks A and B in a prescribed sequence to be discussed.

The programmable controller 14 for the switch interface operates as a system commonly known as a finite-state machine having nine predescribed states. The transition between these prescribed states occurs only as a result of a input switch command or as a result of a system reaction to the input switch commands so as to correctly control the activation of the desired Banks or Banks of relays in a predetermined sequence.

The programmable controller 14 establishes predetermined durations for determining if the received switch commands are valid and if these input switch commands should be responded to at the time of receipt. Although there are two master switches, Master Switch #1 and Master Switch #2, the controller does not differentiate between the two when determining if a response is necessary. Thus a "Make '1A' to common" previously discussed with regard to FIG. 2(b) now referred to as 'Make A' switch input generates the same response regardless of the master switch source of the 'Make A' input. The situation is similar to the "Make "1B" to Common" ('Make B'). For example, assume that the device is operating in two-bank mode, and no response is pending execution, and then a 'Make B' is detected at Master Switch input #1. As a result, each relay in Bank B is sequentially activated for 120 ms beginning with relay 1B and ending with relay nB. If, instead, a 'Make B' was detected at Master Switch input #2, the same response would have been executed.

The programmable controller 14 operates in a sequential manner determined by the built-in logic mechanization, firmware routines, or predetermined software routines contained therein. The predetermined sequences, to be described, are related to routines that are programmed or built into the programmable controller and are termed as firmware routines which are found in the microprocessor art. It should be recognized that these routines are commonly referred to as software but are not so limited. These predetermined routines, to be now described, only allow for a response to a switch input command that satisfies the conditions given as;

1. No transitions in the switch state of either leg of a Master Switch shall be observed when polled or sensed for a period of 500 microseconds at a rate of 1 sample/25 microseconds. When this condition is satisfied, the Master Switch is considered stable throughout the polling period.

2. The state of an individual leg of either of the Master Switches #1 or #2 is considered valid only when the received related input signals have been determined to be stable by the programmable controller during a period comprising four successive 500 microsecond periods each spaced apart by 10 milliseconds.

3. The receipt of a switch input command is considered as a valid input signal to the controller only when a comparison done by the controller shows the non-equivalence of two successive valid states of the corresponding legs, with one state being previously stored in the memory (RAM) of the controller.

The satisfaction of condition 1, is necessary in order to assure that the system neglects or compensates for the difference between the time that the changes in the input legs of either Master Switch #1 or #2 are acknowledged by the programmable controller as being present at its input ports. The specified variation is necessary in order to compensate for the tolerances of the resistors and the capacitors used in the switch conditioning input circuit 12. A classification of the Master Switch #1 or #2 input change given in condition 1 is necessary in order to distinguish between the type of switches that may be used for Master Switch #1 or #2, that is, a two-wire maintained, a three-wire maintained or a momentary contact switch. If the operating routines of the controller determines (1) that both legs of the received Master Switch #1 or #2 have changed simultaneously, that is within + or −500 microseconds, and (2) that both legs of the Master Switch are at the same logic level as can be achieved by having the user of the switch hard-wire together two-legs of the Master Switch, then (3) the switch under consideration is classified by the programmable controller as being a two-wire maintained switch. The programmable controller accepts a valid two-wire switch input applied to the switching conditioning input circuit and interprets such inputs as either a "'Make Switch' To Common" or a "'Break Switch' From Common". The programmable controller upon sensing that the A and B inputs of either Master Switch #1 or #2 undergo transitions independently, infers that the switch stimuli is a three-wire maintained or momentary switch and as such, classifies the received switch input as "Make 'A' To Common", or "Make 'B' to Common", or 'Break A' or 'Break B' from Common".

Figure 5:
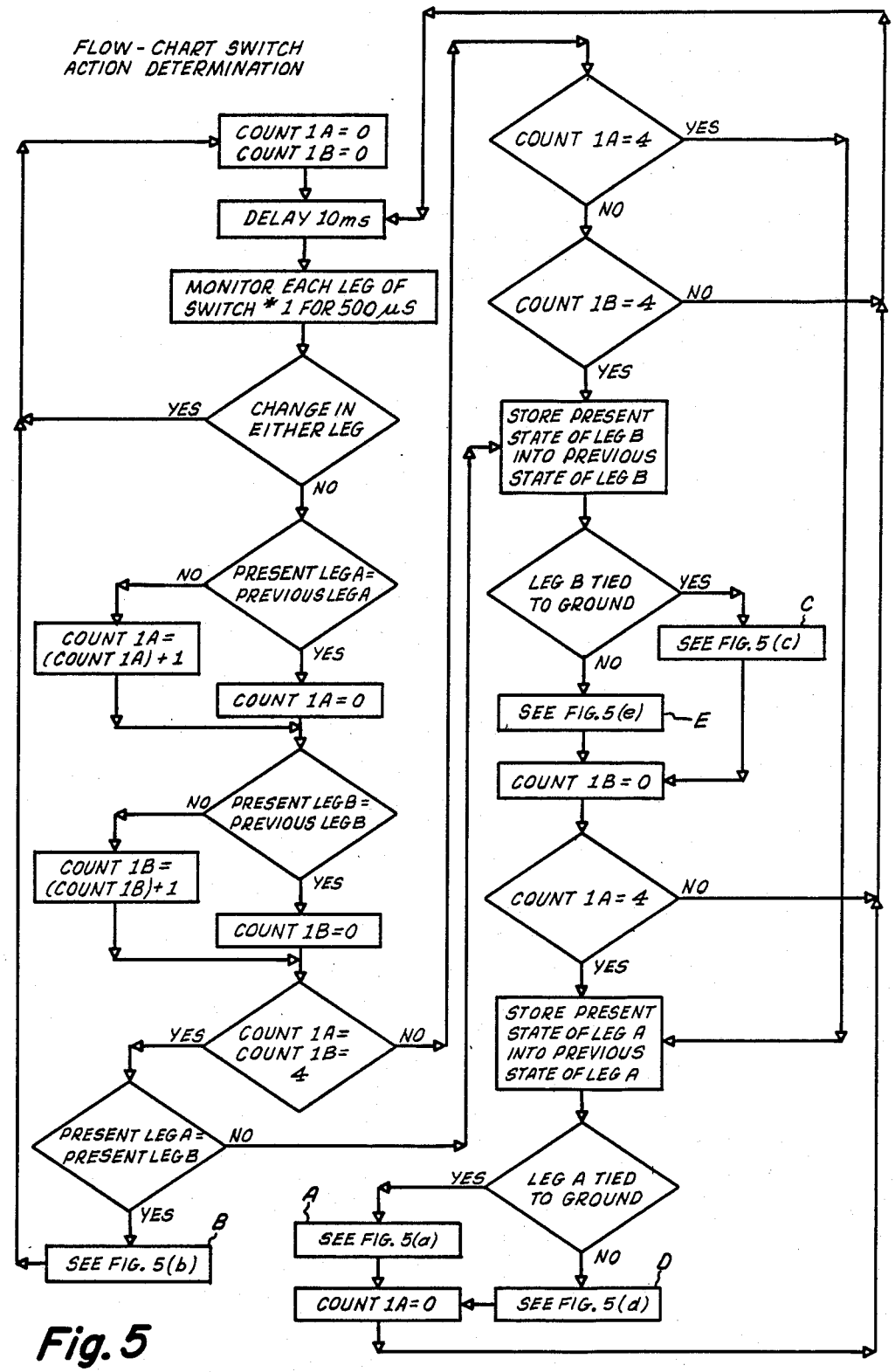
FIG. 5 is an illustration of a flow chart related to the switch action determination by the programmable controller of the present invention.

The operation of the predetermined routines within the programmable controller may be described with reference to FIG. 5. FIG. 5 shows a flow diagram related to Master Switch #1 and is equally applicable to Master Switch #2. The nomenclature Count 1A and Count 1B shown in FIG. 5 have the definitions given in Table 5.

Table 5

Count 1A Number of successive 500 microsecond periods (separated by 10 millisecond intervals) which occurred without a change in state of Input A of either Master Switch #1 or #2. Has a minimum value of 0 and a maximum value of 4.

Count 1B Number of successive 500 microsecond periods (separated by 10 millisecond intervals) which occurred without a change in state of Input B of either Master Switch #1 or #2. Has a minimum quantity of 0 and a maximum quantity of 4.

Figure 5A:
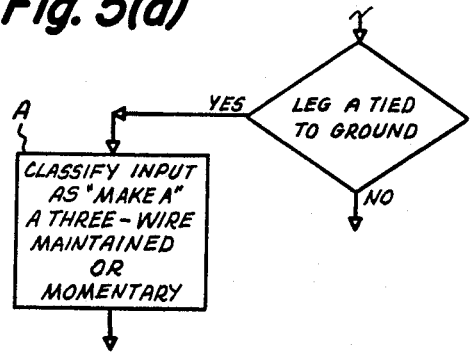
Figure 5B:
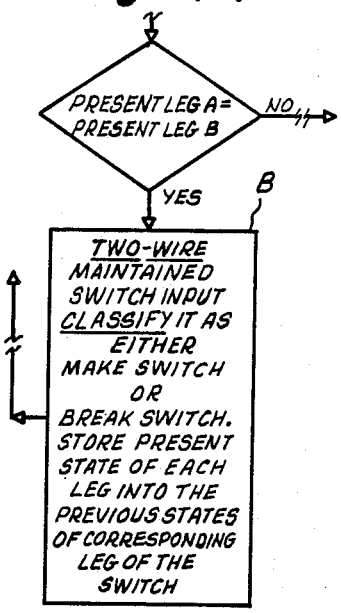
Figure 5C:
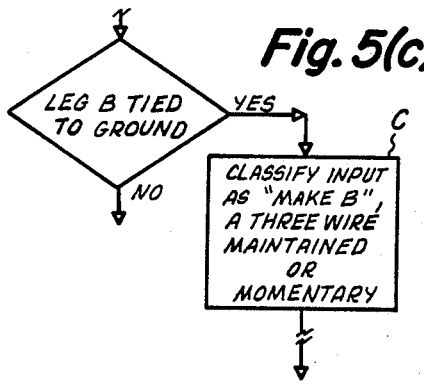
Figure 5D:
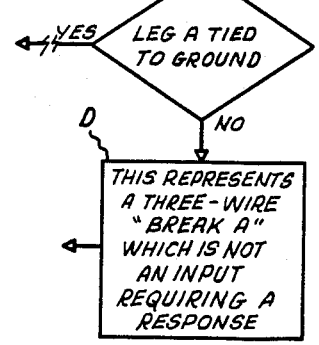
Figure 5E:
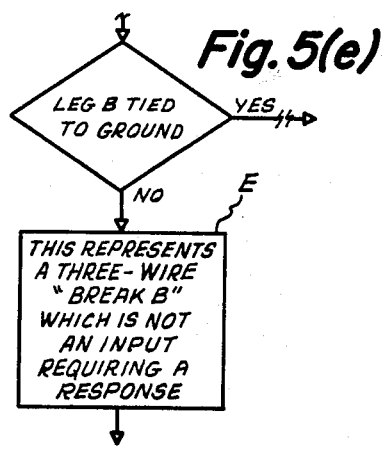

The flow chart of FIG. 5, representative of the operating routines of the programmable controller, is initialized with Count 1A and Count 1B set to a zero (0) quantity. The operating routines sequences in a manner shown in FIG. 5 to determine the classification of the switch input as shown in FIGS. 5(a)–5(e). FIG. 5(a) shows the classification of the input as "Make A" related to a three-wire maintained or momentary switch. FIG. 5(b) show the classification of the two-wire maintained switch as being either "Make Switch" or "Break Switch". FIG. 5(c) shows the classification of the input as "Make B" related to a three-wire maintained or momentary switch. FIG. 5(d) shows the classification as related to a three-wire of "Break A" that does not require a response by the programmable controller. Similarly, FIG. 5(e) shows the classification as related to a three-wire switch of "Break B" that does not require a response by the programmable controller.

The description related to FIG. 5 and FIGS. 5(a) 5(e) along with the discussion related to the operating mode of programmable controller concerned with the switches of FIG. 1 are equally applicable to the operating mode of the programmable controller concerned with the telephone interaction with the except that the Mode Select Switch of FIG. 1 has no impact on the RTEL program routines.

Figure 6:
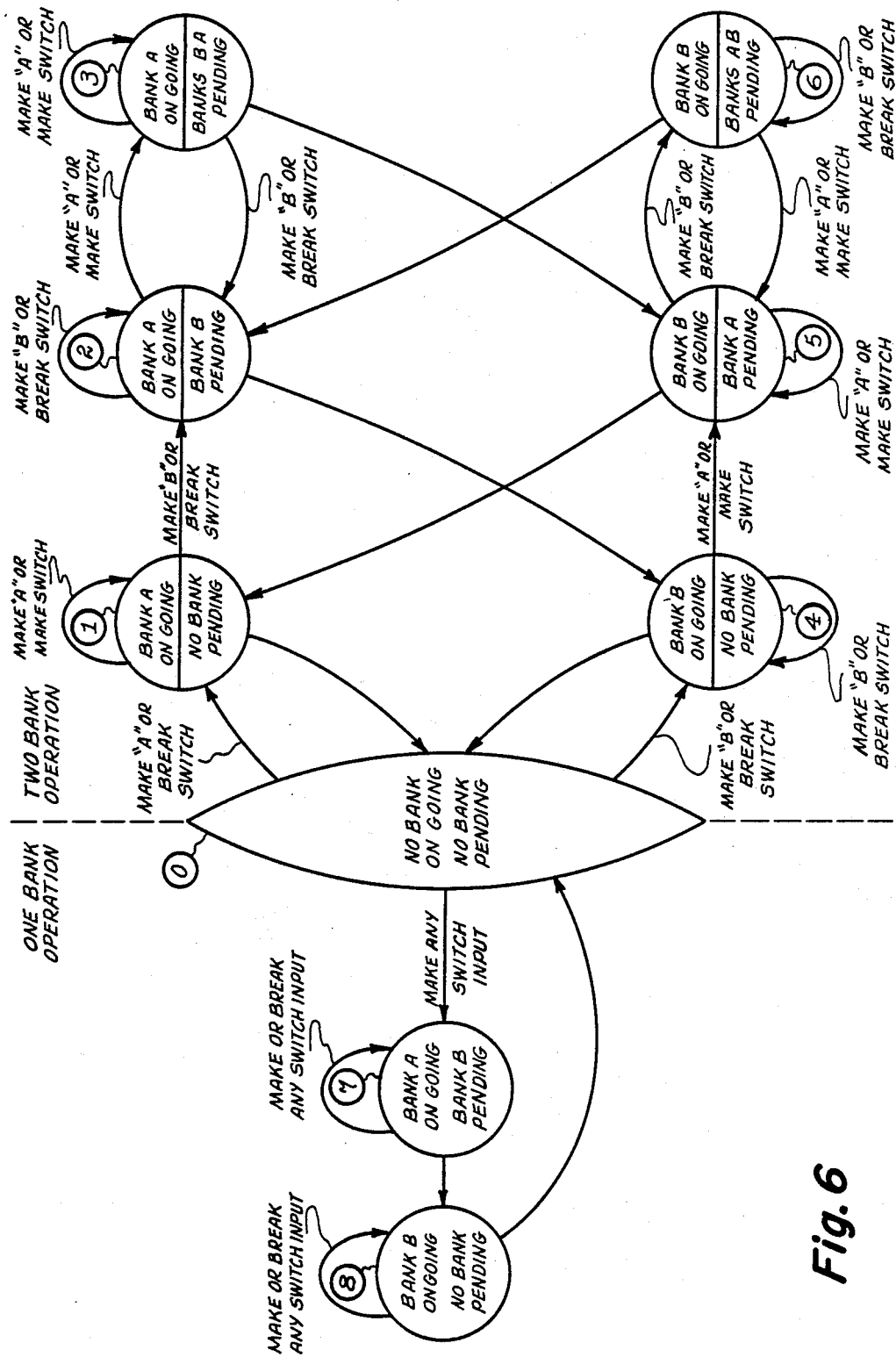
FIG. 6, is a illustration of a state diagram related to the programmable controller of the present invention the response to switch input commands.

In response to valid received switch commands related to the switch interface of FIG. 1, the programmable controller sequences in a prescribed manner as illustrated in the state diagram of FIG. 6. The state diagram of FIG. 6 represents the operation of sequential devices such as the routines built-into the programmable controller or as sequential logic mechanizations which may also be employed by the practice of this invention. The state diagram has nine states, 0 to 8, each indicated by an enclosing circle, with the state 0 being the neutral state common to the ONE BANK OPERATION and TWO BANK OPERATION shown in FIG. 6. The states applicable to the ONE BANK OPERATION are 0, 7 and 8, whereas, the states applicable to the TWO BANK OPERATION are 0, 1, 2, 3, 4, 5 and 6.

In general, when a change in the position of either Master Switch #1 or #2 is detected, the programmable system controller 10 of FIG. 1 is classified as operating to control the Bank of relays A and B or Bank A relays or Bank B relays. The controlling or classification is determined by the the Mode Select switch previously discussed. Based upon the classification, the system may proceed to state 7, if one mode has been selected, or to state 1 or 4 if the two mode operation signal has been received. As all states, excluding the neutral state 0, have some system response associated with them, the system begins to execute the illustrated appropriate response. If during the illustrated response, no additional switch inputs are received prior to the completion of the illustrated response, the system returns to the neutral state 0 upon completion and again waits for a change in either of the Master Switch #1 or #2 position. However, if a switch input is sensed and confirmed during any of the illustrated states and prior to the output response completion of the illustrated states, the programmable controller may cause the programmable controller to enter another non-neutral state as it continues with the response it has already undertaken. No change in the condition of a received input switch command causes a response of the illustrated state to be terminated once it has begun. However, a change in the condition of a received input switch command may create a condition wherein the response of the illustrated state is placed into a two-entry queue (the pending queue) of events so as to be executed or it may exit or pop out of a response in progress and subsequently execute a response from the pending queue as determined by the state diagram shown in FIG. 6. For example, while the programmable controller is operating in state 0 and a "Make A" switch input is detected from either master switch, the programmable controller transitions to state 1. The programmable controller then activates each relay of Bank A for 120 ms, sequentially beginning with relay 1A and continuing until relay nA is activated. If no additional switch inputs are received while in state 1, after relay nA is pulsed, the device proceeds to state 0. However, if a "Make B" input is detected originating from either master switch prior to the activation of relay nA, the programmable controller proceeds to state 2. The activation of Bank A relays continues sequentially until relay nA has been pulsed for 120 ms. However, after relay nA is pulsed, the system proceeds to state 4. State 4 indicates that the programmable controller activates the relays of Bank B and, therefore, each relay in Bank B is pulsed for 120 ms beginning with relay 1B and continuing until relay nB is activated for 120 ms. At the completion of this sequence, the programmable controller returns to state 0 again,, providing that no "Make A" or "Make Switch" inputs are validated by the controller while in state 4.

The received input switch command can affect the responsiveness of the system to various input received command signals. For example, with reference to FIG. 6, in particular, to state 1 of FIG. 6, either of two switch actions, "Make B" or "Break Switch" causes the programmable controller to proceed to the next state that is state 2, whereas, from state 2 these same two actions will not cause the programmable controller to proceed to the next state. It is this varying degree of responsiveness characteristic of the states shown in FIG. 6 that assures the existence of a desired final state, that is the selection of the proper relays being driven by the controller, without the need to respond to each and every switch command received by the programmable controller. The transition between states may be seen with reference to a State Transition matrix of Table 6.

TABLE 6

STATE TRANSITION CONDITIONS FOR TRANSITION FROM PRESENT TO NEXT STATE

| PRESENT STATE | NEXT STATE | RECEIPT OF SWITCH INPUT | COMPLETION OF BANK ACTIVATION OUTPUT |
| --- | --- | --- | --- |
| 0 | 1 | Make A or Make Switch | X |
|   | 4 | Make B or Break Switch | X |
|   | 7 | Make any Switch while in one-bank mode | X |
| 1 | 2 | Make B or Break Switch | X |
|   | 0 | — | A |
| 2 | 3 | Make A or Make Switch | X |
|   | 4 | — | A |
| 3 | 2 | Make B or Break Switch | X |
|   | 5 | — | A |
| 4 | 5 | Make A or Make Switch | X |
|   | 0 | — | B |
| 5 | 6 | Make B or Break Switch | X |
|   | 1 | — | B |
| 6 | 5 | Make A or Make Switch | X |
|   | 2 | — | B |
| 7 | 8 | — | A |
| 8 | 0 | — | B | wherein: X signifies an output operation is in process during the receipt of the related switch input and the given state completes such operation before responding to the received inputs.

Table 6 is segmented into three major columns which are Present State, Next State, and Conditions For Transitions from the Present State to the Next State. The present states given in Table 6, that is 0, 1, 2, 3, 4, 5, 6, 7, and 8, transition into their next state, arranged in the related column, upon the occurrence of the conditions respectively given in Table 6. For example, the present state 0 will transition to the next state 1 upon the receipt of an input signal indicative of the "Make A" or "Make Switch" switch input commands respectively related to Master Switches #1 or #2. Similarly, with regard to Table 6 and in cooperation with FIG. 6, the present state 0 will transition to a next state 4 upon the receipt by the programmable controller of "Make B" or "Break Switch" input. Similarly, the present state 0 will transition to the next state 7 upon the receipt of the switch input "Make Any Switch" while in the one-bank mode of operation, that is, the Master Select Switch is selected to the A+B position. The "Make Any Switch" is representative of "Make A", "Make B" or "Make Switch".

The advantages of the operation of the present invention may be described with reference to Table 7 which illustrates the operation of the present invention upon the sequential receipt of 11 separate switch input commands detected by the programmable controller 14 while the programmable system controller of FIG. 1 is operating in the two-bank mode of operation.

TABLE 7

STATE TRANSITION EXAMPLE
WHILE OPERATING IN TWO-BANK MODE

| PRESENT STATE | TIME (ms) | SWITCH ACTION DETECTED | NEXT STATE |
|---|---|---|---|
| 0 | 0 | Make A of Switch 1 | 1 |
| 1 | 10 | Make A of Switch 2 | 1 |
| 1 | 130 | Make A of Switch 1 | 1 |
| 1 | 180 | Make B of Switch 2 | 2 |
| 2 | 190 | Make B of Switch 1 | 2 |
| 2 | 200 | Make A of Switch 1 | 3 |
| 3 | 250 | Break Switch of Switch 1 | 2 |
| 2 | 300 | Make Switch of Switch 1 | 3 |
| 3 | 350 | Make B of Switch 2 | 2 |
| 2 | 400 | Break Switch of Switch 1 | 2 |
| 2 | 410 | Make A of Switch 2 | 3 |

From Table 7 it is seen that the sequence of 11 switch inputs is responded to by the programmable controller while it is operating in the one bank mode of operation during a 410 millisecond duration. As shown in Table 7, the result of the received 11 input switch commands, cause the programmable controller to activate Bank A only once which is then followed by the sequence activation of bank B, which, in turn, is followed, again by the activation of bank A. Thus, as a result of the controller in response to 11 received input actions only three reactions were executed by the controller.

The advantages of the operations of the present invention may be more fully appreciated when compared to other prior art devices receiving the same 11 switch commands illustrated in Table 7. Other prior art devices, discussed in the "Background" section, that respond to only the first and last switch command received by a programmable controller, would disadvantageously cause the activation of Bank A relays twice and Bank B relays would not be activated. This is clearly unsatisfactory, when considered, for example, if Bank A output drivers were connected to the relays on control lines 1A to nA and Bank B relays were connected onto control lines 1B to nB, the Bank B relays would not be serviced at all.

The present invention may also be compared to prior art programmable system controller which respond to all of 11 switch actions that may be received within a predetermined duration. Such response may result in lengthening the desired response time of the controller so to disadvantageously provide an inadequate servicing of the controllable relays.

With regard to the present programmable controller operating in the one bank mode, any valid "Make Switch" actions received while no response is taking place or pending action, causes the output of Bank A, followed by those of Bank B, to be activated in a sequential manner. While the sequencing is in process, all further switch commands affect neither the state or the response of the device as is shown in Table 8.

TABLE 8

STATE TRANSITION EXAMPLE
WHILE OPERATING IN ONE-BANK MODE

| PRESENT STATE | TIME (ms) | SWITCH ACTION DETECTED | NEXT STATE |
|---|---|---|---|
| 0 | 0 | Make A of Switch 1 | 7 |
| 7 | 180 | Make B of Switch 2 | 7 |
| 7 | 240 | Make A of Switch 2 | 7 |
| 7 | 320 | Make B of Switch 1 | 7 |

In the present invention the programmable system controller 10 in response to the one or two bank modes of operation assures that a proper response once begun is carried through to its completion. This assurance sets up a upper limit of the duty cycle of the solid state devices that are driving the relays so as to not exceed the drivers' duty cycle and thereby minimize the power dissipation requirements of the solid state devices that are activating or driving the relays.

Figure 7:
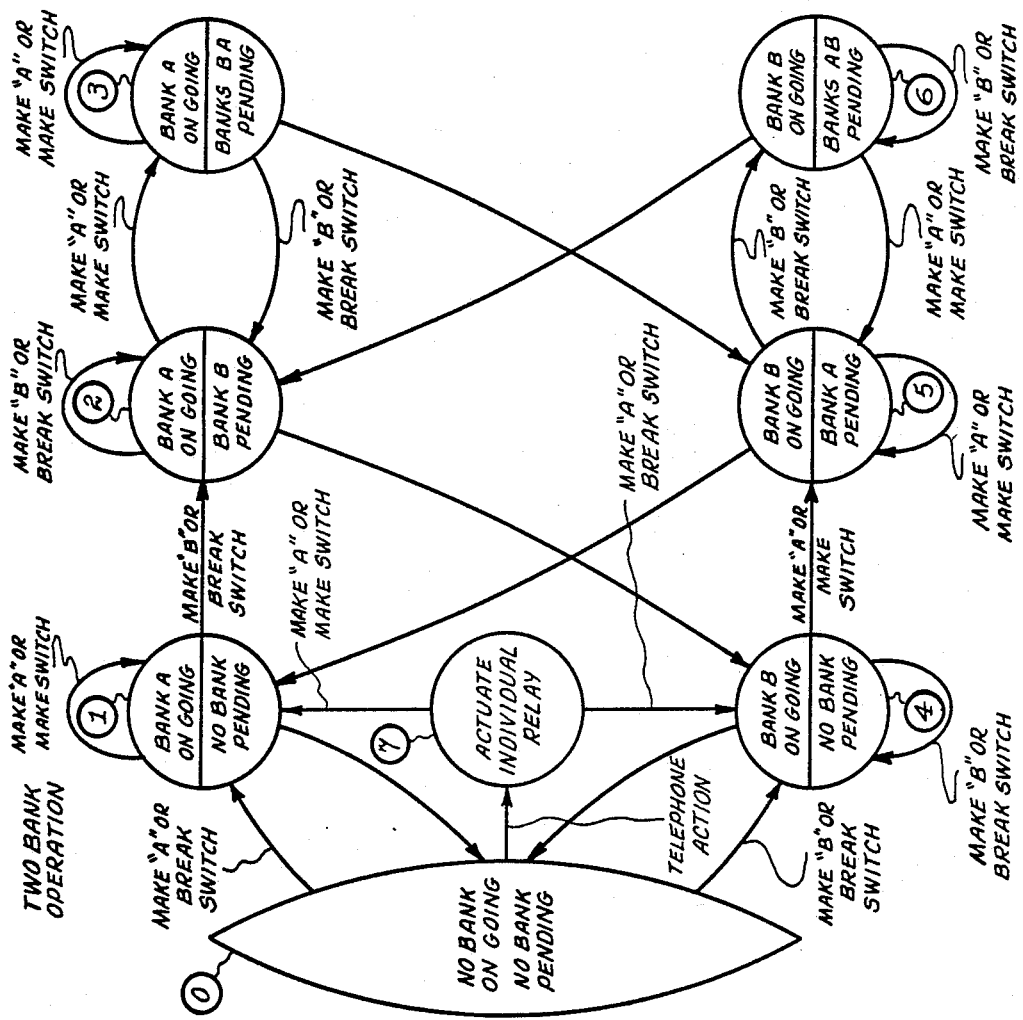
FIG. 7 is an illustration of a state diagram related to the programmable controller of the present invention in response to switch input commands and telephone related actions.

The description of the programmable controller related to the state diagram of FIG. 6 and its associated benefits described with regard to Tables 6, 7 and 8 are applicable to the operation of the programmable controller with the RTEL except that the RTEL is controlled by the state diagram of FIG. 7. The state diagram of FIG. 7 is similar to FIG. 6 except it has eight states 0 to 7 and the RTEL is of the previously described TWO BANK OPERATION of FIG. 6 and does not have need of the described ONE BANK OPERATION of FIG. 6. The previously described operation of FIG. 6 related to states 0–6 is applicable to that of FIG. 7. The state 7 of FIG. 7 is related to "Actuate Individual Relay" having as it input "Telephone Action" generated by the routines of programmable system controller previously discussed with regard to the RTEL operation. The state 7 of FIG. 7 has outputs "Make A or Make Switch" and "Make A or Break Switch" which are respectively routed to states 1 and 4 and generated in a manner as described with regard to FIG. 6.

It should now be appreciated that the practice of the present invention provides a programmable system controller that correctly responds to a multiplicity of input switch commands and provides such response with adequate time between receipt of its inputs so that the relays, Bank A and Bank B are properly controlled. Further, the practice of the present invention provides for a predetermined or desired operation of its programmable controller that compensates or preferentially adapts the programmable controller to the need of the input devices such as allowing three-wire maintained, two-wire maintained or momentary switches to be employed. Still further, the programmable system controller provides the generation of the control signal that takes into account the desired duty cycle of the drivers activating the relays. Further still, the programmable system controller of the present invention responds to and directs the manual operation of a telephone device for the selection of relays to be activated in a controlled sequence within a predetermined duration.

What we claim and desire to secure by Letters Patent of the United States is:

1. A programmable system controller for controlling a plurality of distributed electrical loads including a plurality of control circuits comprising;
   one or more input selectable means of various types comprising three-wire maintained switches, two-wire maintained switches, and momentary activated switches, each of said selectable means having its arm appropriately connected to a source of excitation so that said excitation is representative of one or more positions of said arm of said selectable means for respectively generating one or more switch control signals from said selectable means;
   conditioning means for receiving the one or more switch command signals representative of the one or more positions of said selectable means and respectively generating in response thereto one or more representative digital signals;
   programmable means for receiving one or more representative digital signals and having means for determining the various type of said input selectable means and if said generated switch command signals are present and constant for predetermined durations, said programmable means responding to said present and constant switch commands and generating output digital quantities in response thereto;
   sequencer means for receiving said output digital quantities and generating in response thereto on or more sequence control signals;
   said control circuits for receiving said sequence control signals and generating in response thereto drive signals so as to control the on-off state of remote devices
   wherein said predetermined durations of said means of said programmable means comprises;
   (a) means for sensing the state of the one or more representative digital signals about once every twenty-five microseconds; and
   (b) means for sensing that the states of the one or more representative digital signals do not change for about 500 microseconds.

2. A programmable system controller according to claim 1 wherein said predetermined durations of said means of said programmable means further comprises;
   (a) means for sensing that the condition of 5(b) has not changed for four consecutive 500 microsecond periods spaced apart from each other by a duration of 10 milliseconds.

3. A programmable system controller according to claim 2 wherein said predetermined durations of said means of said programmable means further comprises;
   (a) means for sensing that two consecutive final conditions of 6 (a) are different.

4. A method of operating a programmable system controller for controlling a plurality of distributed electrical loads including a plurality of control circuits comprising;
   providing one or more input selectable means of various types comprising three-wire maintained switches, two-wire maintained switches, and momentarily activated-switches, said selectable means being appropriately connected to an excitation source for respectively generating one or more switch command signals;
   interconnecting conditioning means to said one or more input selectable means for receiving the one or more switch command signals, said conditioning means respectively generating in response to said one or more input selectable means one or more representative digital signals;
   interconnecting programmable means to said conditioning means for receiving one or more representative digital signals, said programmable means having means for determining the various type of said input selectable means and if said generated switch command signals are present and constant for predetermined durations, said programmable means responding to said present and constant switch commands and generating output digital quantities in response thereto;
   interconnecting sequencer means to said programmable means for receiving said output digital quantities, said sequencer means generating in response to said output digital quantities one or more sequencer control signals;
   interconnecting said control circuits to said sequencer means for receiving said sequence control signals, said control circuits generating in response to said sequence control signals drive signals so as to control the on-off state of remote devices;
   wherein said predetermined durations of said means of said programmable means comprises;
   (a) sensing the state of the one or more representative digital signals about once every twenty-five microseconds; and
   (b) sensing that the states of the one or more representative digital signals do not change for about 500 microseconds.

5. A method of operating a programmable system controller according to claim 4 wherein said predetermined durations of said means of said programmable means further comprises;
   (a) sensing that the condition of 15(b) has not changed for four consecutive 500 microsecond periods spaced apart from each other by a duration of 10 milliseconds.

6. A method of operating a programmable system controller according to claim 5 wherein said predetermined durations of said means of said programmable means further comprises;
   (a) sensing that two consecutive final conditions of 16(a) are different.

* * * * *